(12) United States Patent
Yamakage et al.

(10) Patent No.: US 12,088,173 B2
(45) Date of Patent: Sep. 10, 2024

(54) ELECTRIC COMPRESSOR

(71) Applicant: KABUSHIKI KAISHA TOYOTA JIDOSHOKKI, Aichi-ken (JP)

(72) Inventors: Shumpei Yamakage, Aichi-ken (JP); Junya Yano, Aichi-ken (JP); Yusuke Kinoshita, Aichi-ken (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 281 days.

(21) Appl. No.: 17/688,135

(22) Filed: Mar. 7, 2022

(65) Prior Publication Data
US 2022/0294308 A1    Sep. 15, 2022

(30) Foreign Application Priority Data

Mar. 9, 2021 (JP) ................. 2021-037632

(51) Int. Cl.
*H02K 5/22* (2006.01)
*B60H 1/32* (2006.01)
(Continued)

(52) U.S. Cl.
CPC ......... *H02K 5/225* (2013.01); *H01R 13/5202* (2013.01); *H01R 13/5205* (2013.01);
(Continued)

(58) Field of Classification Search
CPC .......... H02K 5/225; H02K 11/33; H02K 5/10; H02K 11/0094; H01R 13/5202;
(Continued)

(56) References Cited

U.S. PATENT DOCUMENTS 8,441,160 B2    5/2013   Watanabe et al.
2013/0260585 A1  10/2013  Wang
(Continued)

FOREIGN PATENT DOCUMENTS

CN   102900648 A    1/2013
CN   110318978 A   10/2019
(Continued)

*Primary Examiner* — Tulsidas C Patel
*Assistant Examiner* — Joshua Kiel M Rodriguez
(74) *Attorney, Agent, or Firm* — Greenblum & Bernstein, P.L.C.

(57) ABSTRACT

An electric compressor includes an inverter, a housing with an opening, an inverter connector, a power connector, and a cable that electrically connects both connectors. The housing accommodates the inverter. The inverter connector includes a cover, an outer sealing member, and an inner sealing member. The cover includes an insertion hole through which the cable is inserted, and is disposed in the opening so as to position the cable in the opening. The outer sealing member is interposed between the opening and the cover. The inner sealing member is interposed between the insertion hole and the cable. The insertion hole includes a restriction portion that restricts a movement of the cable, and a fitting portion that is located closer to the inverter than the restriction portion and in which the inner sealing member is fitted. The insertion hole is narrower at the restriction portion than at the fitting portion.

3 Claims, 4 Drawing Sheets (51) Int. Cl.
*H01R 13/52* (2006.01)
*H02K 11/33* (2016.01)

(52) U.S. Cl.
CPC ......... *H01R 13/5213* (2013.01); *H02K 11/33* (2016.01); *B60H 1/3222* (2013.01)

(58) Field of Classification Search
CPC ............ H01R 13/5205; H01R 13/5213; H01R 13/5221; B60H 1/3222; F04B 35/04; F04B 39/00; F04B 49/06; F04B 53/16; F05B 2210/14
See application file for complete search history.

(56) References Cited

U.S. PATENT DOCUMENTS

2019/0052070 A1* 2/2019 Hattori .................. H02G 3/22
2019/0305467 A1 10/2019 Kinoshita et al.

FOREIGN PATENT DOCUMENTS

| JP | S50-132690 U | 10/1975 |
|----|----|----|
| JP | S50-133495 U | 11/1975 |
| JP | H02-053253 U | 4/1990 |
| JP | 2001-007566 A | 1/2001 |
| JP | 2002-174177 A | 6/2002 |
| JP | 2009106049 A * | 5/2009 |
| JP | 2011-163231 A | 8/2011 |
| JP | 2013206590 A | 10/2013 |

* cited by examiner

ELECTRIC COMPRESSOR

CROSS-REFERENCE TO RELATED APPLICATION

This application claims priority to Japanese Patent Application No. 2021-037632 filed on Mar. 9, 2021, the entire disclosure of which is incorporated herein by reference.

BACKGROUND ART

The present disclosure relates to an electric compressor.

Japanese Patent Application Publication No. 2011-163231 discloses an electric compressor. The above electric compressor includes a compression portion, an electric motor, an inverter, a housing, and a harness. The compression portion compresses a refrigerant. The electric motor drives the compression portion. The inverter controls and drives the electric motor. The housing accommodates the compression portion, the electric motor, and the inverter. The harness includes an inverter connector located at one end of the harness and electrically connected to the inverter, a power connector located at the other end of the harness and electrically connected to an external power supply, and a cable electrically connecting the inverter connector and the power connector.

More specifically, the housing includes a compressor housing, a motor housing, and an inverter box. The compressor housing accommodates the compression portion, the motor housing accommodates the electric motor, and the inverter box accommodates the inverter. The compressor housing, the motor housing, and the inverter box are integrally assembled. The inverter connector is fixed to the inverter box.

The inverter connector includes a junction box serving as a housing, a cover, and a grommet serving as an inner sealing member. The junction box includes inside a conductive terminal electrically connected to the inverter. The cover through which a cable is inserted is assembled to the junction box. The grommet seals a gap between the cover and the cable.

In the above-described electric compressor, with power supplied to the inverter from the external power supply through the cable, the inverter controls and drives the electric motor. Then, the electric motor drives the compression portion so as to activate an air conditioning system on a vehicle or the like.

However, in the above-described electric compressor, airtight performance inside the inverter connector may deteriorate. In particular, if an external force is applied to the harness cable of the above-described electric compressor during operations such as assembly and maintenance, the grommet may be deformed so that the airtight performance inside the inverter connector may deteriorate. In that case, foreign matters from outside comes into contact with the inverter, which adversely affects the durability of the electric compressor and the like. The external force may cause a significant problem to a harness cable having a flexibility in particular, by causing a bend deformation at a position of the cable around the grommet.

The present disclosure has been made in view of the above circumstances and is directed to providing an electric compressor capable of maintaining airtight performance of an inverter even when an external force is applied to the cable.

SUMMARY

In accordance with an aspect of the present disclosure, there is provided an electric compressor including a compression portion, an electric motor, an inverter, a housing, and a harness. The compression portion is configured to compress a refrigerant. The electric motor is configured to drive the compression portion. The inverter is configured to control and drive the electric motor. The housing accommodates the compression portion, the electric motor, and the inverter in the housing, and includes an opening. The harness includes an inverter connector that is electrically connected to the inverter, a power connector that is electrically connected to an external power supply; and a cable that is flexible and electrically connects the inverter connector and the power connector. The inverter connector is disposed in the opening. The inverter connector includes a cover, an outer sealing member, and an inner sealing member. The cover includes an insertion hole through which the cable is inserted. The cover is disposed in the opening of the housing so as to position the cable in the opening. The outer sealing member is interposed between the opening and the cover. The inner sealing member is interposed between the insertion hole and the cable. The insertion hole includes a restriction portion and a fitting portion. The restriction portion restricts a movement of the cable. The fitting portion is located closer to the inverter than the restriction portion. The inner sealing member is fitted in the fitting portion. The insertion hole is narrower at the restriction portion than at the fitting portion.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe an embodiment according to the present disclosure with reference to the accompanying drawings. An electric compressor according to the embodiment is part of an air conditioning system on a vehicle.

Figure 1:
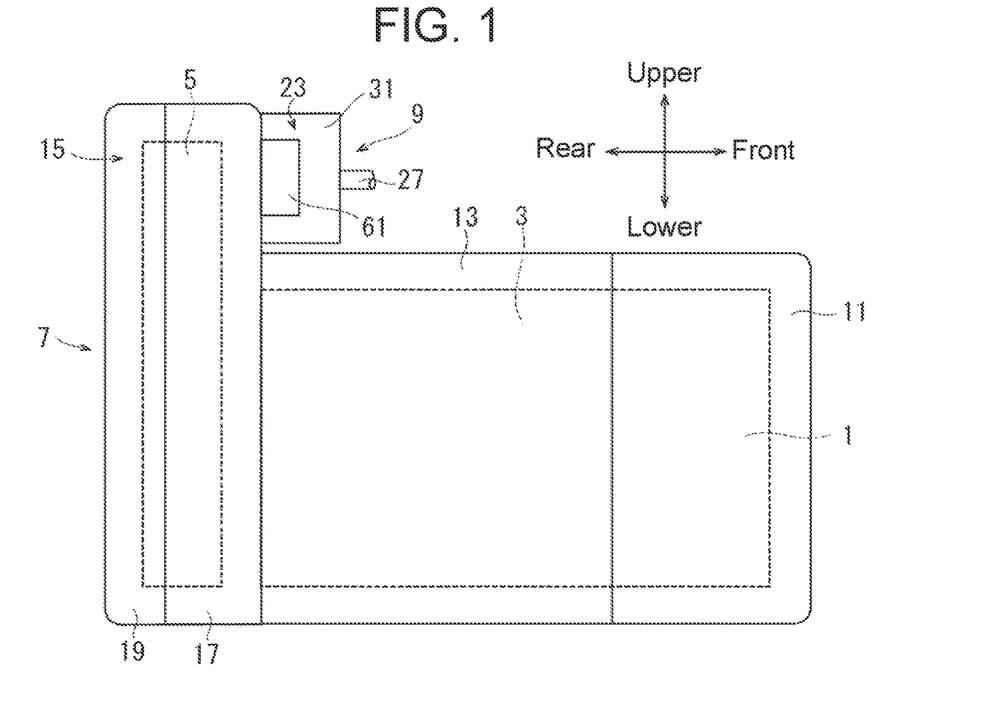
FIG. 1 is a side view of an electric compressor according to an embodiment of the present disclosure.
Figure 2:
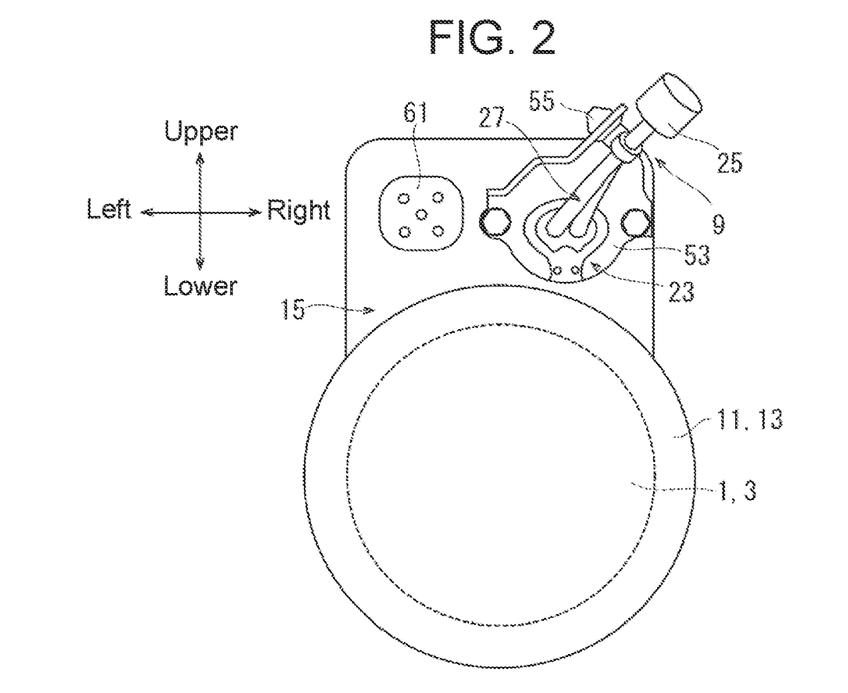
FIG. 2 is a front view of the electric compressor according to the embodiment.

In the following description, a right side of FIG. 1 is referred to as a front side of the electric compressor whereas a left side of FIG. 1 is referred to as a rear side of the electric compressor. An upper side of FIG. 1 is referred to as an upper side of the electric compressor whereas a lower side of FIG. 1 is referred to as a lower side of the electric compressor. In FIG. 2 and thereafter, the front-rear direction and the up-down direction of the electric compressor correspond to those in FIG. 1. The front-rear direction and the up-down direction of the embodiment is an example. A mounting position of the electric compressor of the embodiment may be changed appropriately depending on a vehicle on which the electric compressor is mounted.

Referring to FIGS. 1 and 2, the electric compressor according to the embodiment includes a compression portion 1, an electric motor 3, an inverter 5, a housing 7, and a power feed harness 9.

The compression portion 1 is of a scroll type. The compression portion 1 compresses a refrigerant taken in through an inlet port (not illustrated) and discharges the refrigerant, which is highly pressurized, through an outlet port (not illustrated). The electric motor 3 drives the compression portion 1. The inverter 5 controls and drives the electric motor 3.

The housing 7 includes a compressor housing 11, a motor housing 13, an inverter box 15, and a hermetic case 31. The compressor housing 11, the motor housing 13, the inverter box 15, and the hermetic case 31 are made of aluminum ahoy. The compressor housing 11 accommodates the compression portion 1, and the motor housing 13 accommodates the electric motor 3. The inverter box 15 accommodates the inverter 5. The compressor housing 11, the motor housing 13, and the inverter box 15 are integrally assembled. The motor housing 13 has the inlet port and the compressor housing 11 has the outlet port. The hermetic case 31 has an opening 32.

Figure 5:
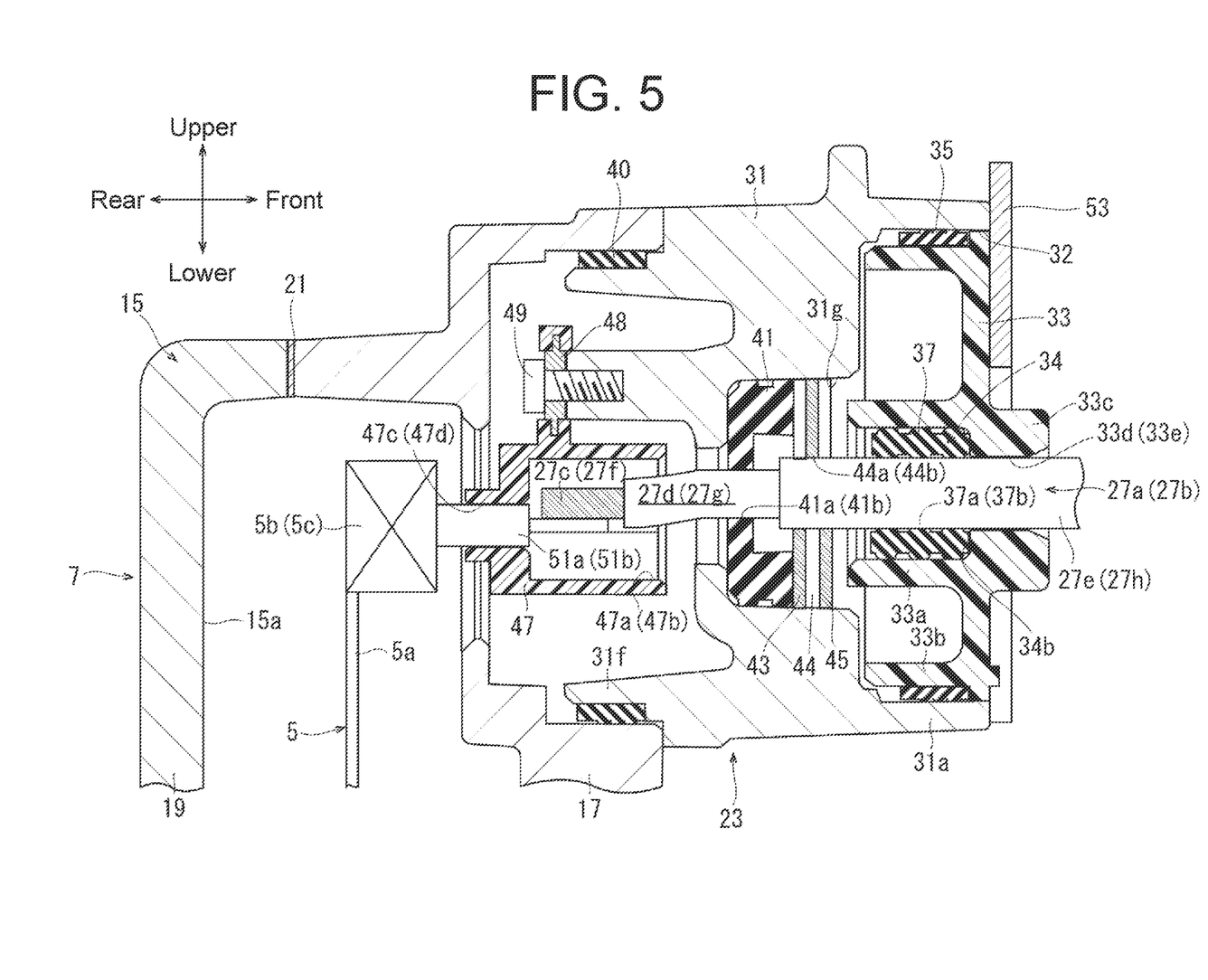
FIG. 5 is a cross-sectional view of a main part of the electric compressor according to the embodiment.

The inverter box 15 includes a front case 17 disposed on a side close to the motor housing 13, and a rear case 19 disposed on the rear side of the inverter box 15. Referring to FIG. 5, the front case 17 and the rear case 19 are joined to each other with a bolt (not illustrated) with a gasket 21 interposed therebetween. The front case 17 and the rear case 19 define an inverter chamber 15a that accommodates the inverter 5.

Figure 3:
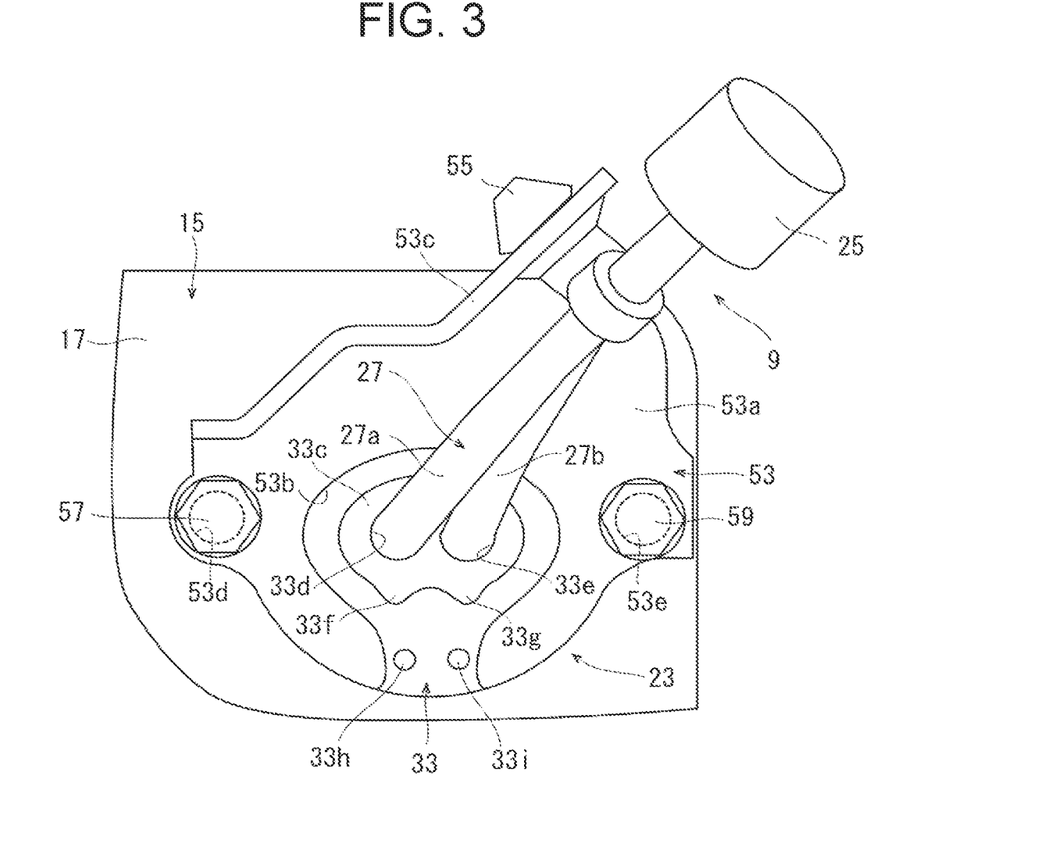
FIG. 3 is an enlarged front view of a main part of the electric compressor according to the embodiment.

As illustrated in FIGS. 1 and 2, the power feed harness 9 corresponds to a harness of the present disclosure. The power feed harness 9 includes an inverter connector 23, a power connector 25, and a cable 27. The cable 27 electrically connects the inverter connector 23 and the power connector 25. As illustrated in FIG. 3, the cable 27 includes a positive cable 27a that transmits a positive current and a negative cable 27b that transmits a negative current.

Figure 4:
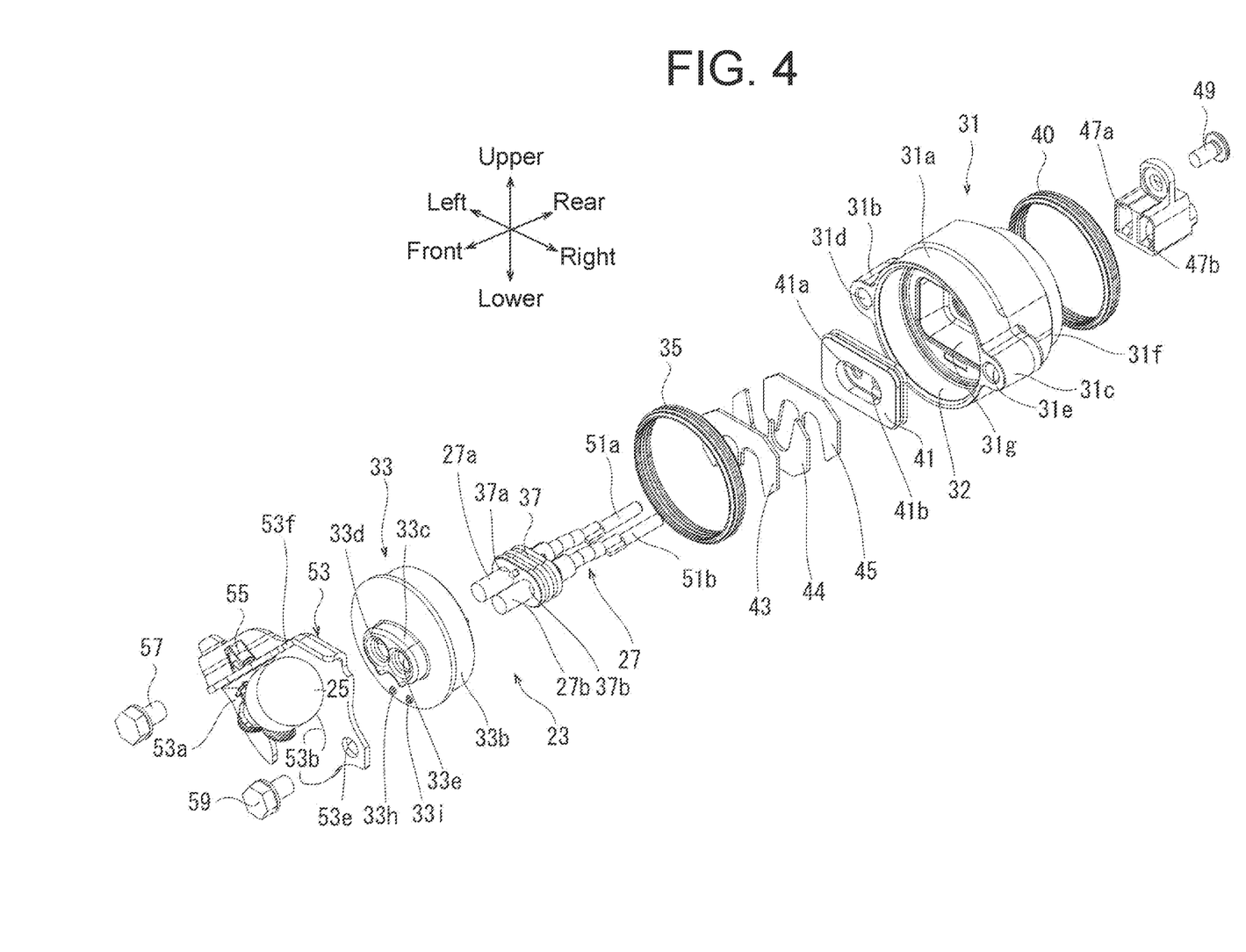
FIG. 4 is an exploded perspective view of an inverter connector and surrounding components of the electric compressor according to the embodiment.

As illustrated in FIG. 4, the inverter connector 23 includes a cap 33, an outer grommet 35, and an inner grommet 37. The cap 33 corresponds to a cover, the outer grommet 35 corresponds to an outer sealing member, and the inner grommet 37 corresponds to an inner sealing member. The cap 33 is attached to the hermetic case 31, which is part of the housing 7.

As illustrated in FIG. 5, the hermetic case 31 includes a front cylindrical portion 31a protruding forward in a cylindrical shape from an outer periphery of the hermetic case 31. The opening 32 is opened into the front cylindrical portion 31a. As illustrated in FIG. 4, the front cylindrical portion 31a has two bosses 31b and 31c integrally formed with an outer periphery of the front cylindrical portion 31a. The bosses 31b and 31c have bolt holes 31d and 31e, respectively. The bolt holes 31d and 31e extend in the front-rear direction. As illustrated in FIG. 5, the hermetic case 31 also includes a rear cylindrical portion 31f protruding rearward from the outer periphery of the hermetic case 31.

In the hermetic case 31, the rear cylindrical portion 31f is fitted into an opening of the front case 17 of the inverter box 15, and is fixed to the front case 17 with a bolt (not illustrated). A grommet 40 having an annular shape is provided between the rear cylindrical portion 31f and the front case 17. The grommet 40 is made of rubber.

As illustrated in FIG. 4, the hermetic case 31 has an accommodation chamber 31g having a quadrangular prism shape with a long side extending in the right-left direction. The accommodation chamber 31g is inwardly recessed from a front end of the hermetic case 31. As illustrated in FIG. 5, the accommodation chamber 31g communicates with an interior of the front cylindrical portion 31a and an interior of the rear cylindrical portion 31f. The accommodation chamber 31g accommodates therein a grommet 41, a first plate 43, a second plate 44, and a third plate 45 disposed in this order from a rear side. The grommet 41 is made of rubber, and disposed in contact with an inner wall surface of the accommodation chamber 31g. The grommet 41 has two insertion-fitting holes therethrough, i.e., third and fourth insertion-fitting holes 41a and 41b disposed adjacent to each other in the right-left direction.

The first plate 43, the second plate 44, and the third plate 45 that are made of metal are press-fitted to the inner wall surface of the accommodation chamber 31g. Each of the first plate 43 and the third plate 45 has a cutout that opens downward, and the second plate 44 has a cutout that opens upward. By combining the first plate 43, the second plate 44, and the third plate 45 together, the combined three cutouts thereof form therethrough two retaining holes, i.e., first and second retaining holes 44a and 44b, disposed adjacent to each other in the right-left direction.

A duster block 47 made of resin is fixed to a rear end of the hermetic case 31 with a bolt 49 via a fixture 48. The cluster block 47 has first and second terminal chambers 47a and 47b divided by a center wall of the cluster block 47 to be disposed adjacent to each other in the right-left direction. The cluster block 47 has a first through hole 47c through which a first conductive terminal 51a rearward extends from the first terminal chamber 47a, and a second through hole 47d through which a second conductive terminal 51b rearward extends from the second terminal chamber 47b.

The cap 33 is made of resin. The cap 33 includes a fitting portion 33a and a rear cylindrical portion 33b. The fitting portion 33a is disposed inside an elliptical tubular portion that has a long side in the right-left direction and extends rearward from a center of the cap 33. The rear cylindrical portion 33b extends rearward from an outer peripheral portion of the cap 33 into a cylindrical shape. The cap 33 also includes a front tubular portion 33c that extends forward from the center of the cap 33 into an elliptical tubular shape having a long side in the right-left direction. The front tubular portion 33c includes two restriction holes therethrough, i.e., first and second restriction holes 33d and 33e. The first restriction hole 33d and the second restriction hole 33e communicate with an interior of the fitting portion 33a. The first restriction hole 33d and the second restriction hole 33e correspond to a restriction portion of the present disclosure. The first restriction hole 33d and the second restriction hole 33e are part of an insertion hole 34 formed in the cap 33. The fitting portion 33a is formed through the cap 33 and through which the positive cable 27a and the negative cable 27b are inserted. The fitting portion 33a is also part of the insertion hole 34. The first restriction hole 33d and the second restriction hole 33e each has a diameter that slightly increases toward a front end thereof. As illustrated in FIG. 3, the front tubular portion 33c has, in a lower portion thereof, two raised portions 33f and 33g downwardly protruding and disposed adjacent to each other in the right-left direction. The cap 33 also has, on a lower front surface thereof, raised portions 33h and 33i frontward protruding in a short distance and disposed adjacent to each other in the right-left direction.

As illustrated in FIG. 5, the fitting portion 33a accommodates the inner grommet 37 therein. More specifically, the inner grommet 37 is inserted to be fitted with the fitting portion 33a. In the insertion hole 34, the fitting portion 33a is located closer to the inverter 5 than the first restriction hole 33d and the second restriction hole 33e are. The inner grommet 37 is made of rubber. The inner grommet 37 has two insertion-fitting holes therethrough, i.e., first and second insertion-fitting holes 37a and 37b disposed adjacent to each other in the right-left direction. The inner grommet 37 has projections and depressions annularly extending on an outer peripheral surface thereof, and each of the first insertion-fitting hole 37a and the second insertion-fitting hole 37b also has projections and depressions annularly extending on an inner peripheral surface thereof. The first insertion-fitting hole 37a of the inner grommet 37 is concentric with the first restriction hole 33d of the cap 33, and the second insertion-fitting hole 37b of the inner grommet 37 is concentric with the second restriction hole 33e of the cap 33. The cap 33 has a contact surface 34b to be in contact with the inner grommet 37 inside the fitting portion 33a so that the inner grommet 37 is supported by the contact surface 34b. The contact surface 34b also corresponds to the restriction portion of the present disclosure. The insertion hole 34 is narrower at the first restriction hole 33d and the second restriction hole 33e than at the fitting portion 33a. In other words, opening areas of the first restriction hole 33d and the second restriction hole 33e are smaller than an opening area of the fitting portion 33a.

The outer grommet 35 is interposed between the rear cylindrical portion 33b and the opening 32 of the hermetic case 31. The outer grommet 35 is also made of rubber. The outer grommet 35 has a cylindrical shape with projections and depressions annularly extending on an outer peripheral surface thereof. The outer grommet 35 seals a gap between the opening 32 and the rear cylindrical portion 33b, and by extension between the hermetic case 31 and the cap 33.

A bracket 53 is disposed in front of the cap 33. The bracket 53 is provided by a thin metal plate. As illustrated in FIG. 4, the bracket 53 includes a bracket main body 53a to be in contact with the front surface of the cap 33. The bracket main body 53a has a cutout 53b through which the front tubular portion 33c of the cap 33 protrudes. The cap 33 is configured so that the raised portions 33f and 33g and the raised portions 33h and 33i protrude through the cutout 53b when the bracket 53 is appropriately assembled to the cap 33, as illustrated in FIG. 3, which reduces a likelihood of erroneous assembly of the bracket 53.

The bracket 53 includes an arm 53c forwardly extending from the bracket main body 53a. A clamp 55 is held on the arm 53c. The clamp 55 is configured to hold both the positive cable 27a and the negative cable 27b together. The bracket main body 53a has therethrough bolt holes 53d and 53e that coincide with the bolt holes 31d and 31e of the hermetic case 31, respectively. As illustrated in FIG. 4, the bracket 53 has a cutout 53f between the bracket main body 53a and the arm 53c. The cutout 53f is provided by a weak portion so that the arm 53c is easily deformed in case of a collision of the vehicle on which the electric compressor is mounted. This configuration reduces a likelihood of electric leakage from the positive cable 27a or the negative cable 27b.

A bolt 57 is inserted through the bolt hole 53d of the bracket 53 and screwed into the bolt hole 31d of the hermetic case 31. A bolt 59 is inserted through the bolt hole 53e of the bracket 53 and screwed into the bolt hole 31e of the hermetic case 31.

As illustrated in FIG. 5, the positive cable 27a includes a first conductor 27c provided by a plurality of conductive wires twisted together, a first insulator 27d coaxially covering the first conductor 27c, and a first sheath 27e coaxially covering the first insulator 27d. The negative cable 27b includes a second conductor 27f provided by a plurality of conductive wires twisted together, a second insulator 27g coaxially covering the second conductor 27f, and a second sheath 27h coaxially covering the second insulator 27g.

The first conductor 27c of the positive cable 27a is soldered to the first conductive terminal 51a in the first terminal chamber 47a of the cluster block 47. The first insulator 27d is inserted through the third insertion-fitting hole 41a of the grommet 41. The first sheath 27e is inserted through the first retaining hole 44a of the first plate 43 to the third plate 45, the first insertion-fitting hole 37a of the inner grommet 37, and the first restriction hole 33d of the cap 33. The second conductor 27f of the negative cable 27b is soldered to the second conductive terminal 51b in the second terminal chamber 47b of the cluster block 47. The second insulator 27g is inserted through the fourth insertion-fitting hole 41b of the grommet 41. The second sheath 27h is inserted through the second retaining hole 44b of the first plate 43 to the third plate 45, the second insertion-fitting hole 37b of the inner grommet 37, and the second restriction hole 33e of the cap 33. The inner grommet 37 seals gaps between the insertion hole 34 and the first sheath 27e and between the insertion hole 34 and the second sheath 27h, and by extension, between the cap 33 and the cable 27. The cap 33 defines a position of the cable 27 inside the opening 32.

The positive cable 27a and the negative cable 27b drawn out of the inverter connector 23 are held by the clamp 55 as illustrated in FIG. 3, and sharply bent outside the inverter connector 23 so as to fit in a space for mounting the electric compressor on the vehicle.

As illustrated in FIG. 5, the inverter 5 disposed in the inverter chamber 15a includes a circuit board 5a, and first and second connecting portions 5b and 5c disposed adjacent to each other in the right-left direction on the circuit board 5a. The first conductive terminal 51a in the first terminal chamber 47a of the cluster block 47 is connected by fitting in the first connecting portion 5b. The second conductive terminal 51b in the second terminal chamber 47b of the cluster block 47 is connected by fitting in the second connecting portion 5c. In this way, the inverter connector 23 at one end of the power feed harness 9 is electrically connected to the inverter 5. The first conductive terminal 51a and the second conductive terminal 51b electrically connect the inverter 5 and the cable 27.

The inverter connector 23 is fixed to the front case 17 as described below. The positive cable 27a having the first conductor 27c soldered to the first conductive terminal 51a is inserted through the third insertion-fitting hole 41a of the grommet 41, the first insertion-fitting hole 37a of the inner grommet 37, and the first restriction hole 33d of the cap 33. The negative cable 27b having the second conductor 27f soldered to the second conductive terminal 51b is inserted through the fourth insertion-fitting hole 41b of the grommet 41, the second insertion-fitting hole 37b of the inner grommet 37, and the second restriction hole 33e of the cap 33. The inner grommet 37 is inserted into the fitting portion 33a until the inner grommet 37 comes in contact with the contact surface 34b.

The first plate 43 to the third plate 45 through which the positive cable 27a and the negative cable 27b are inserted are disposed between the grommet 41 and the inner grommet 37. The first conductor 27c and the second conductor 27f and the first conductive terminal 51a and the second conductive terminal 51b are disposed inside the rear cylindrical portion 31f through the accommodation chamber 31g of the hermetic case 31. The grommet 41 is fitted and the first plate 43 to the third plate 45 are press-fitted in the accommodation chamber 31g. In this state, the outer grommet 35 held in the rear cylindrical portion 33b of the cap 33 is fitted in the opening 32 of the hermetic case 31.

The first conductive terminal 51a is inserted through the first through hole 47c of the cluster block 47 and the second conductive terminal 51b is inserted through the second through hole 47d of the cluster block 47, The cluster block 47 is fixed to the hermetic case 31 with the bolt 49. The grommet 40 held in the rear cylindrical portion 31f of the hermetic case 31 is fitted in the front case 17, and the hermetic case 31 is fixed to the front case 17 with a bolt (not illustrated).

As described above, the inverter connector 23 is fixed to the front case 17 of the inverter box 15. Since the bracket 53 is also fixed to the front case 17 together with the hermetic case 31, a separate component to fix the bracket 53 alone to the front case 17 is not required. This configuration reduces the number of components, and thus a production cost of the electric compressor is reduced.

The power connector 25 illustrated in FIGS. 2 and 3 is located at the other end of the power feed harness 9 and is electrically connected to an external power supply (not illustrated). The external power supply is a battery to be mounted on the vehicle.

As illustrated in FIG. 2, the inverter box 15 includes a control connector 61 on a front wall of the front case 17. An inverter connector of a control harness (not illustrated) is connected to the control connector 61. The control harness includes a controller connector electrically connected to the inverter connector with a cable. The controller connector is connected to a controller mounted on the vehicle.

In the electric compressor configured as described above, a high-voltage electricity is supplied from the battery to the inverter 5 through the positive cable 27a and the negative cable 27b. Then, the inverter 5 controls and drives the electric motor 3, and the electric motor 3 drives the compression portion 1 so as to activate the air conditioning system on the vehicle.

During the above operation of the electric compressor, the inverter connector 23 is hermetic inside by the grommet 41, the outer grommet 35, and the inner grommet 37. The inverter chamber 15a is also hermetic by the gasket 21, the grommet 40, the inverter connector 23, and the like.

More specifically, the inverter connector 23 is hermetic inside since the inverter connector 23 includes the outer grommet 35, in addition to the hermetic case 31, the cap 33, the inner grommet 37, and the like.

During operations such as assembly and maintenance of the electric compressor, an external force can be applied to the positive cable 27a or the negative cable 27b of the power feed harness 9. In particular, the positive cable 27a and the negative cable 27b that are flexible are bent outside the inverter connector 23 since the bracket 53 to which the clamp 55 is mounted is fixed to the hermetic case 31. However, in this electric compressor, the cap 33 includes the first restriction hole 33d and the second restriction hole 33e so that radial movements of the positive cable 27a and the negative cable 27b are restricted with the positive cable 27a in contact with the first restriction hole 33d and the negative cable 27b in contact with the second restriction hole 33e. Especially, the positive cable 27a is inserted through the first insertion-fitting hole 37a of the inner grommet 37 whereas the negative cable 27b is inserted through the second insertion-fitting hole 37b of the inner grommet 37 so that the inner grommet 37 seals a gap around the positive cable 27a and a gap around the negative cable 27b, independently. This configuration allows restrictions on deformation in the inner grommet 37, and thus, the airtight performance inside the inverter connector 23 is maintained high. In addition, the bracket 53 and the clamp 55 restrict excessive bend deformations in the positive cable 27a and the negative cable 27b in a case where an additional external force is applied to the positive cable 27a or the negative cable 27b.

As described above, in the electric compressor according to the embodiment, the airtight performance is maintained inside the inverter 5 even if an external force is applied to the cable 27. Thus, external foreign matters are unlikely to come into contact with the inverter 5 so that great durability is likely to be achieved.

The present disclosure has been described above in accordance with the embodiment. The scope of the present disclosure is not limited to the embodiment described above but is intended to include any modifications as far as they offer equivalent effects in essence to the scope of the disclosure.

For example, the compression portion 1 of the electric compressor according to the above-described embodiment is of the scroll type. However, the compression portion 1 may be of a different type such as a vane type or a swash plate type.

In the electric compressor according to the above-described embodiment, the inverter connector 23 is fixed to the front case 17 of the inverter box 15. However, the inverter connector 23 may be fixed to the rear case 19 of the inverter box 15 or the motor housing 13, instead.

In the electric compressor according to the above-described embodiment, the hermetic case 31 is part of the housing 7. However, the hermetic case 31 may be part of the inverter connector 23, instead.

In the electric compressor according to the above-described embodiment, the first conductor 27c is connected to the first conductive terminal 51a by soldering. However, the first conductor 27c may be connected to the first conductive terminal 51a by welding or crimping, instead. Likewise, the second conductor 27f is connected to the second conductive terminal 51b by soldering. However, the second conductor 27f may be connected to the second conductive terminal 51b by welding or crimping, instead.

INDUSTRIAL APPLICABILITY

The present disclosure is applicable to an air conditioning system or the like to be mounted on a vehicle.

What is claimed is:
1. An electric compressor comprising:
a compression portion configured to compress a refrigerant;
an electric motor configured to drive the compression portion;
an inverter configured to control and drive the electric motor;
a housing including a compressor housing accommodating the compression portion, a motor housing accommodating the electric motor, and an inverter box accommodating the inverter; and
a harness including an inverter connector that is electrically connected to the inverter, a power connector that is electrically connected to an external power supply, and a cable that is flexible and electrically connects the inverter connector and the power connector, wherein the inverter box includes a front case disposed on a side close to the motor housing, and a rear case disposed on a rear side of the inverter box, the front case has a first opening, the housing includes a hermetic case, the hermetic case including a front cylindrical portion that protrudes forward in a cylindrical shape from an outer periphery of the hermetic case and a first rear cylindrical portion that protrudes rearward in a cylindrical shape from the outer periphery of the hermetic case, a grommet having an annular shape is provided between the first rear cylindrical portion and the front case, the first rear cylindrical portion is fitted in the first opening, a second opening is formed in the front cylindrical portion, the inverter connector includes:
  a cover including an insertion hole through which the cable is inserted, and disposed in the second opening of the front cylindrical portion so as to position the cable in the second opening, the cover including a front tubular portion, a second rear cylindrical portion, and a fitting portion, the front tubular portion extending from a center of the cover to a side opposite to the inverter, the second rear cylindrical portion extending from an outer peripheral portion of the cover toward the inverter, the fitting portion extending from a position inside the second rear cylindrical portion toward the inverter,
  an outer sealing member interposed between the second opening and the second rear cylindrical portion; and
  an inner sealing member interposed between the fitting portion and the cable, the outer sealing member and the inner sealing member overlapping with each other in a radial direction of the front cylindrical portion of the hermetic case, the insertion hole includes a restriction portion that is formed through the front tubular portion to restrict a movement of the cable, and the fitting portion in which the inner sealing member is fitted, and the insertion hole is narrower at the restriction portion than at the fitting portion.

2. The electric compressor according to claim 1, wherein the restriction portion includes a contact surface that supports the inner sealing member.

3. The electric compressor according to claim 1, wherein the electric compressor includes:
  a bracket fixed to the housing; and
  a clamp mounted to the bracket, wherein
  the cable is held by the bracket and the clamp.

* * * * *